(12) United States Patent
Benavides

(10) Patent No.: US 8,359,154 B2
(45) Date of Patent: Jan. 22, 2013

(54) SYSTEMS AND METHOD FOR DETERMINING PROPELLANT MASS AND CENTER OF GRAVITY FOR A SPACE-BASED ASSET

(75) Inventor: Armando Benavides, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 810 days.

(21) Appl. No.: 12/563,260

(22) Filed: Sep. 21, 2009

(65) Prior Publication Data

US 2011/0071751 A1    Mar. 24, 2011

(51) Int. Cl.
*G01F 7/00*    (2006.01)
(52) U.S. Cl. .............................................. 701/124; 244/2
(58) Field of Classification Search .................. 701/124; 244/2, 73 R; 73/149, 290 R
See application file for complete search history.

(56) References Cited

U.S. PATENT DOCUMENTS

| | | | |
|---|---|---|---|
| 3,603,149 A * | 9/1971 | McKown | ..................... 73/290 V |
| 4,409,821 A | 10/1983 | Battles et al. | |
| 4,554,823 A | 11/1985 | Lilley | |
| 4,722,183 A | 2/1988 | Rosen | |
| 4,729,245 A | 3/1988 | Hansman, Jr. | |
| 4,815,315 A | 3/1989 | Paxton | |
| 4,987,775 A | 1/1991 | Chobotov | |
| 5,158,362 A | 10/1992 | Brauer et al. | |
| 5,586,085 A * | 12/1996 | Lichte | .............. 367/99 |
| 6,053,041 A * | 4/2000 | Sinha | .......................... 73/290 V |
| 6,135,393 A | 10/2000 | Sackheim et al. | |
| 6,305,219 B1 | 10/2001 | Bentz et al. | |
| 6,360,994 B2 | 3/2002 | Hart et al. | |
| 7,114,390 B2 * | 10/2006 | Lizon et al. | ................. 73/290 V |

* cited by examiner

*Primary Examiner* — Dalena Tran
(74) *Attorney, Agent, or Firm* — Armstrong Teasdale, LLP

(57) ABSTRACT

A system for determining a propellant content and a center of gravity in a three-axis stabilized spacecraft includes a ranging device that is coupled to an interior of a propellant tank of the spacecraft. The ranging device is configured to receive a ranging echo to facilitate determining a location of a membrane within the propellant tank.

19 Claims, 6 Drawing Sheets

SYSTEMS AND METHOD FOR DETERMINING PROPELLANT MASS AND CENTER OF GRAVITY FOR A SPACE-BASED ASSET

BACKGROUND

The field of the disclosure relates generally to satellite systems and, more particularly, to determining propellant mass and system center of gravity for satellites.

Accurate knowledge of the center of gravity of the propellant tanks in known satellite systems, such as for example navigation satellites that require highly accurate positioning, also require accurate knowledge of the center of gravity for the entire satellite. With this information the phase center displacement of the navigation system antenna with respect to the satellite's center of gravity may be determined. Reporting accurate location of the phase center of the navigation antenna to a user minimizes the User Range Error (URE), thus increasing the precision of the position reported to the user.

Moreover, accurate knowledge of propellant content in a propellant tank is critical for all satellite missions, i.e., navigation, commercial, scientific or military. With this information all mission lifetimes can be maximized to operate up to full operational and design capabilities, thus maximizing return on investment for a satellite customer. In known spin-stabilized satellites, the artificial gravitational field generated therein enables the use of conventional methods for determining propellant content in the spacecraft. For example, some known spin-stabilized satellites determine the amount of liquid propellant remaining by measuring a height of the liquid within the spacecraft propellant tank. Alternatively, a liquid pressure at the bottom of the tank may be gauged. However, conventional gravity based fuel measurement methods are inappropriate for three-axis stabilized spacecraft due to the absence of a gravitational field of sufficient magnitude.

Accordingly, alternative methods have been developed to estimate the amount of propellant remaining within the propulsion systems of three-axis stabilized spacecraft that operate in zero and/or low gravity environments. Some known satellites use a method that includes monitoring changes in the absolute pressure within the propellant tank to thermodynamically deduce the volume of propellant remaining in the tank. However, the narrow range of absolute pressures within the propellant tanks often results in an unacceptable measurement error. For example, in the case of some known geosynchronous satellites, up to eighty percent of the initial propellant loaded on the spacecraft may be expended to attain the final operational orbit. Thus, a low percentage of the initial propellant load remains at the onset of the operational life of the satellite. Since the absolute pressure variance of the remaining propellant load is relatively small during the operational life of the satellite, predictions of the propellant remaining onboard the satellite are prone to significant error.

Some other known satellite systems that operate in a zero or low gravity environment may employ the "bookkeeping" approach. Specifically, the mass of propellant initially loaded into the spacecraft is recorded. As spacecraft thrusters are fired during launch operations and/or during station keeping maneuvers, the amount of propellant burned during such maneuvers is estimated. The amount of propellant remaining is calculated as the difference between the propellant initially loaded into the spacecraft and that estimated to have been expelled. However, uncertainty with respect to temperature and pressure leads to errors in the determination of the actual quantity of propellant consumed during the aforementioned maneuvers. Such errors tend to accrue over the operational life of the spacecraft, which increases the difficulty in making predictions as to the end of the operational life of the spacecraft. Further, the bookkeeping approach is incapable of accurately accounting for propellant leakage. In practice, the bookkeeping method may yield erroneous end of life predictions in the range of one year for missions of approximately ten years or more. Hence, in such known systems, the one year inaccuracy results in the launch of a replacement spacecraft one year in advance of the nominal launch date under an accurate prediction. Maintaining a replacement satellite in orbit during this uncertainty period is inefficient and tends to increase costs.

The uncertainty in forecasting the probable time of spacecraft propellant expiration and termination of the useful life, as well as inaccurately determining a center of gravity for the spacecraft, tends to complicate mission planning and may cause critical inaccuracies for the satellites users and/or customers.

SUMMARY

One aspect is directed to a three-axis stabilized spacecraft that includes a propellant tank having an interior surface, and a ranging device coupled to the interior surface, wherein the ranging device is configured to receive a ranging echo signal to facilitate determining a location of a membrane within the propellant tank.

Another aspect is directed to a system for determining a propellant content and a center of gravity in a three-axis stabilized spacecraft. The system includes a ranging device coupled to an interior of a propellant tank of the spacecraft, wherein the ranging device is configured to receive a ranging echo signal to facilitate determining a location of a membrane within the propellant tank.

Yet another aspect is directed to a method for determining a propellant content and a center of gravity in a three-axis stabilized spacecraft. The method includes transmitting a ranging signal towards a membrane positioned within a propellant tank of the spacecraft, determining a volume of propellant in the propellant tank using the determined displacement of the membrane, calculating a mass of the propellant in the propellant tank based on the determined volume of the propellant, and determining a center of gravity of the propellant tank based on the calculated mass of the propellant.

Various refinements exist of the features noted in relation to the above-mentioned aspects of the present embodiments. Additional features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

The following description of various embodiments is merely exemplary in nature and is in no way intended to limit the invention, its application, or uses. Additionally, the advantages provided by the embodiments, as described below, are exemplary in nature and not all embodiments provide the same advantages or the same degree of advantages.

Figure 1:
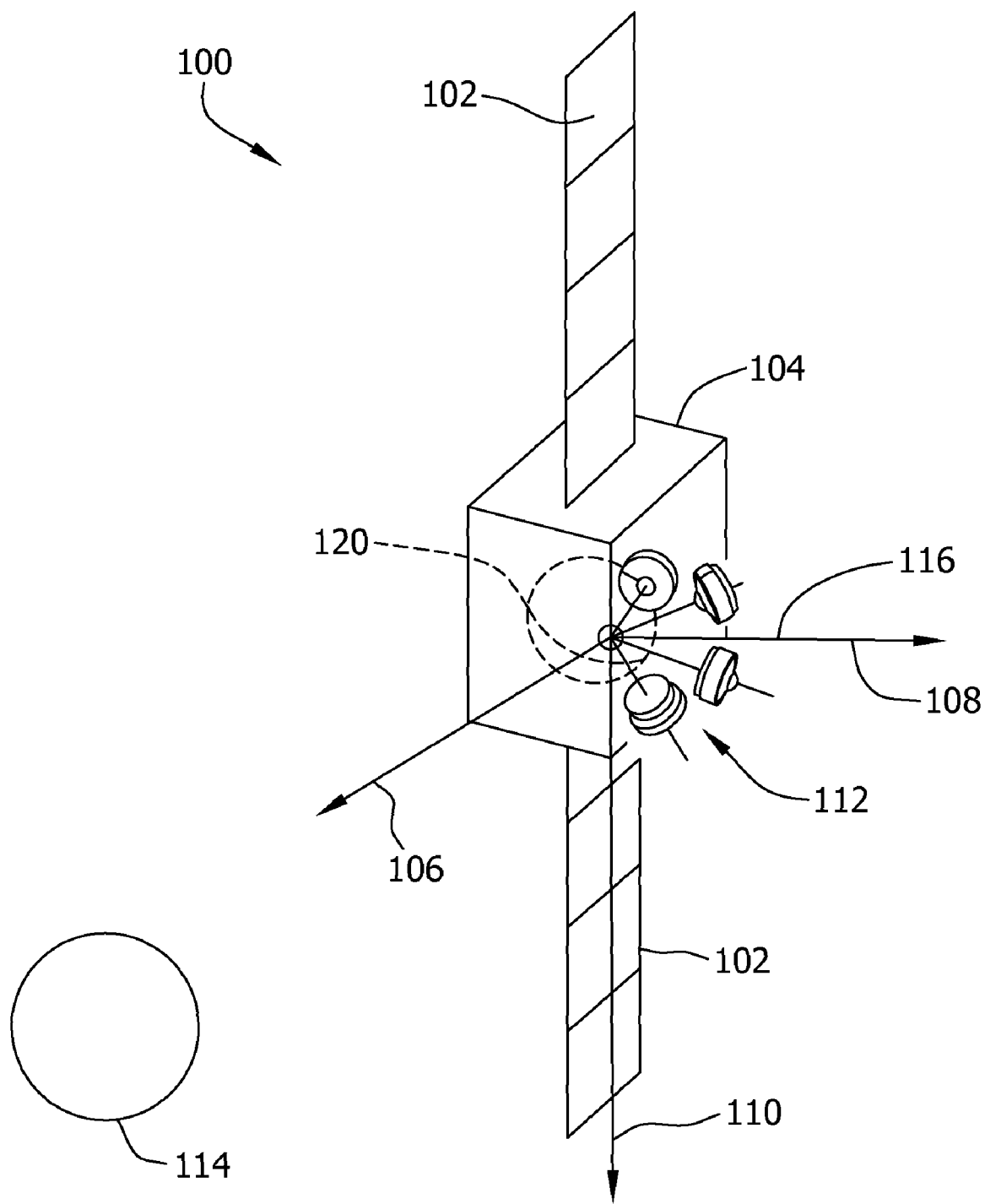
FIG. 1 is a perspective view of an exemplary three-axis stabilized satellite.

FIG. 1 is a perspective view of an exemplary three-axis stabilized satellite system 100. In the exemplary embodiment, satellite system 100 includes two solar arrays 102 that extend radially outward from a central satellite body 104, and is stabilized on yaw 106, roll 108 and pitch 110 axes via a reaction wheel assembly (RWA) 112 positioned within satellite body 104 relative to an orbited body 114. In an alternative embodiment, satellite system 100 may be three-axis stabilized using any type of actuator device, such as for example a plurality of momentum wheels and/or a plurality of thrusters. RWA 112 is positioned within satellite body 104 such that the maximum torque and maximum momentum of RWA 112 is substantially along a thermal shock axis 116 of satellite system 100. This orientation gives RWA 112 sufficient control authority to suppress thermal shock. In the exemplary embodiment, thermal shock axis 116 is the roll axis 108.

Satellite system 100 includes a propellant tank 120 positioned within satellite body 104. In the exemplary embodiment, propellant tank 120 contains a quantity of a propellant, such as for example hydrazine (N2H$_4$), and a quantity of pressurant, such as for example gaseous nitrogen (GN$_2$) that are kept separate by a membrane (not shown in FIG. 1), as described in more detail below. In an alternative embodiment, propellant tank 120 may contain any suitable propellant and pressurant.

Figure 2:
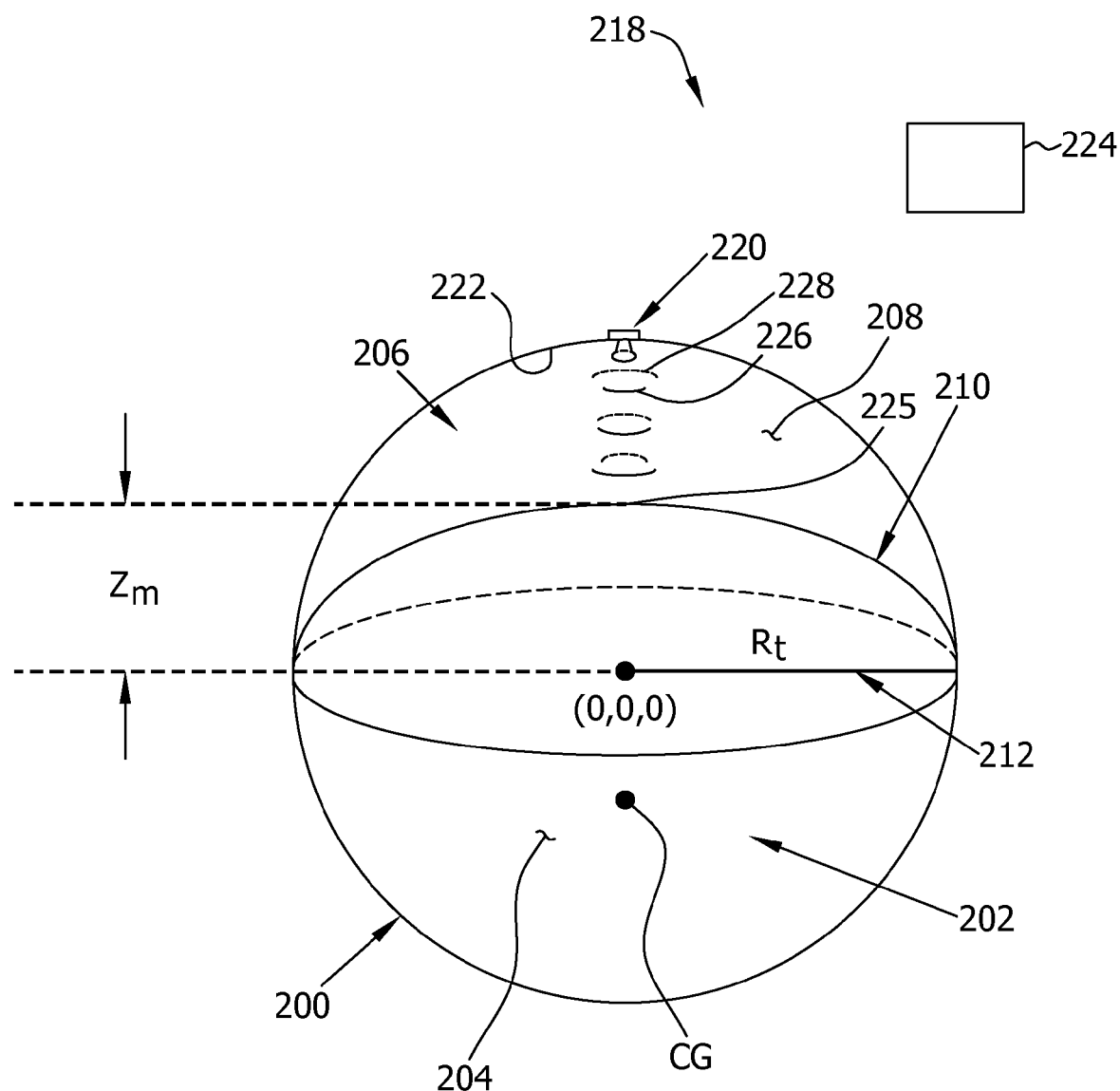
FIG. 2 is a schematic illustration of a system used to determine a propellant mass and center of gravity for the satellite shown in FIG. 1, wherein a propellant tank is shown with a substantially full propellant load.
Figure 3:
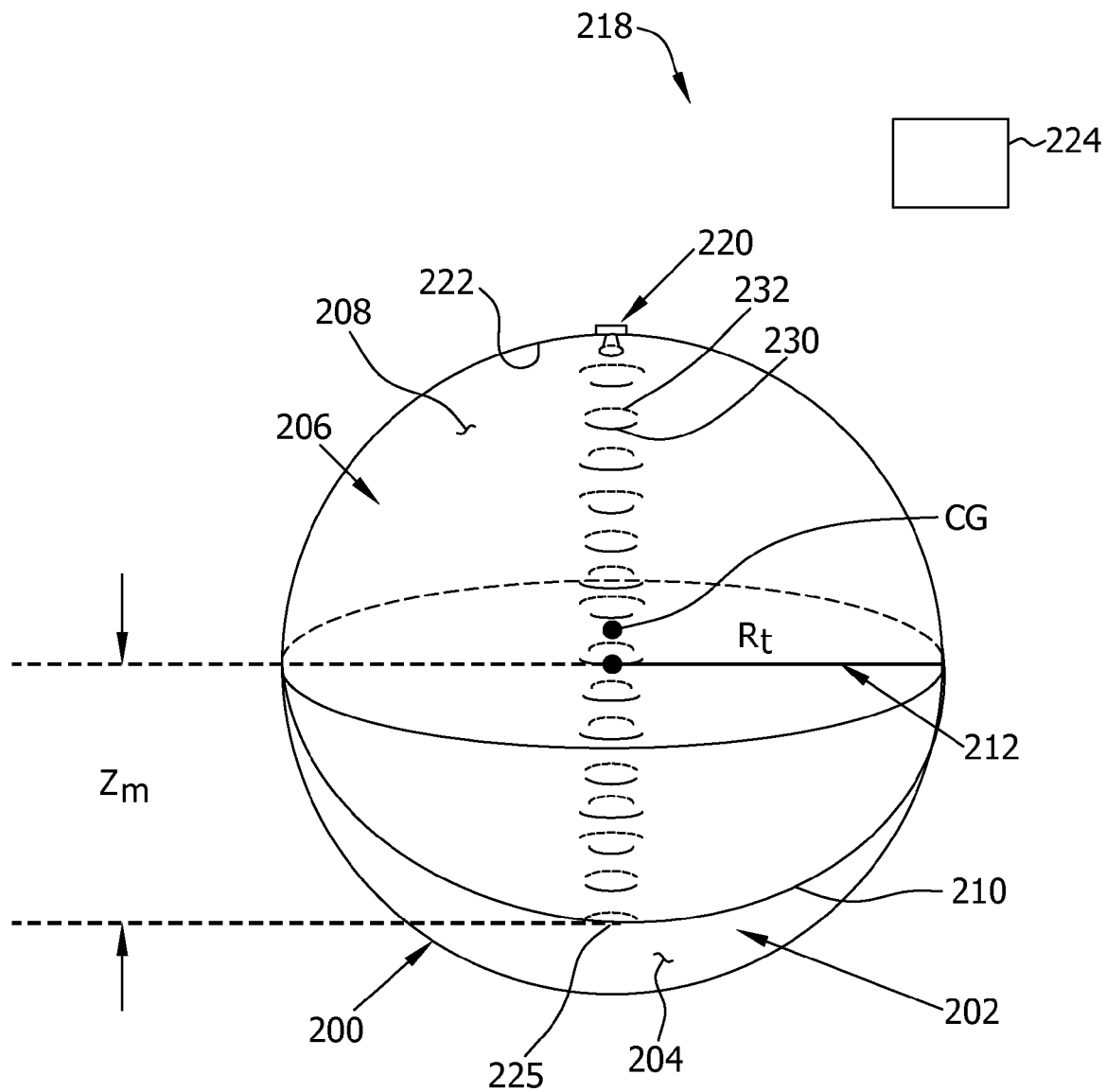
FIG. 3 is a schematic illustration of the system shown in FIG. 2, wherein the propellant tank is shown with a substantially depleted propellant load.

FIG. 2 is a schematic illustration of an exemplary propellant tank 200 shown in a substantially full configuration, and FIG. 3 is a schematic illustration of propellant tank 200 shown in a substantially depleted configuration. In the exemplary embodiment, propellant tank 200 is substantially spherical in shape and includes a propellant section 202 having a quantity of propellant 204 therein, and a pressurant section 206 having a quantity of a pressurant 208 therein. Propellant section 202 and pressurant section 206 are maintained separate from one another by an elastic membrane 210 that will stretch a distance ($z_m$) from a centerline 212 of propellant tank 200 depending upon the amount of propellant 204 that remains in propellant tank 200, as described in more detail herein.

In the exemplary embodiment, satellite system 100 (shown in FIG. 1) includes a system 218 for use in determining a propellant content within propellant tank 200, and a center of gravity (CG) of the satellite system 100 based on the propellant content within propellant tank 200. System 218 facilitates providing a substantially accurate determination of a phase center displacement of the satellite with respect to the satellite's center of gravity (CG), thereby minimizing a User Range Error (URE) and increasing the precision of a position of a user.

System 218 includes a ranging device 220 positioned on an internal surface 222 of propellant tank 200, and a microprocessor 224 that is communicatively coupled to ranging device 220. In the exemplary embodiment, ranging device 220 and microprocessor 224 communicate wirelessly. Alternatively, ranging device 220 and microprocessor 224 communicate via a wired connection, or any communication configuration that enables system 218 to function as described herein. More specifically and in the exemplary embodiment, ranging device 220 is positioned within pressurant section at a location substantially perpendicular to an apex 225 of membrane 210. In the exemplary embodiment, ranging device 220 is an ultrasonic ranging device. Alternatively, ranging device 220 may be any type of ranging device that enables system to function as described herein, such as for example any acoustic or laser ranging device. The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As shown in FIG. 2, propellant tank 200 is substantially full with propellant, and membrane 210 is displaced a distance ($z_m$) from centerline 212 of propellant tank 200. In the exemplary embodiment, ranging device 220 transmits a signal 226 towards membrane 210, which is reflected as signal 228 by membrane 210 back towards ranging device 220. A delay between the transmission of signal 226 and the receipt of returned signal 228 is measured, as described in more detail herein, to facilitate determining the quantity of propellant 204 in propellant tank 200. Similarly, as shown in FIG. 3, membrane 210 is displaced a distance ($z_m$) from centerline 212 of propellant tank 200 as a result of propellant being depleted from propellant tank 200. Ranging device 220 transmits a signal 230 towards membrane 210, which is reflected as signal 232 by membrane 210 back towards ranging device 220. The delay between the transmission of signal 230 and the receipt of returned signal 232 is measured, as described in more detail herein, to facilitate determining the quantity of propellant 204 in propellant tank 200. The center of gravity (CG) of propellant tank 200 is then determined as described herein.

Figure 4:
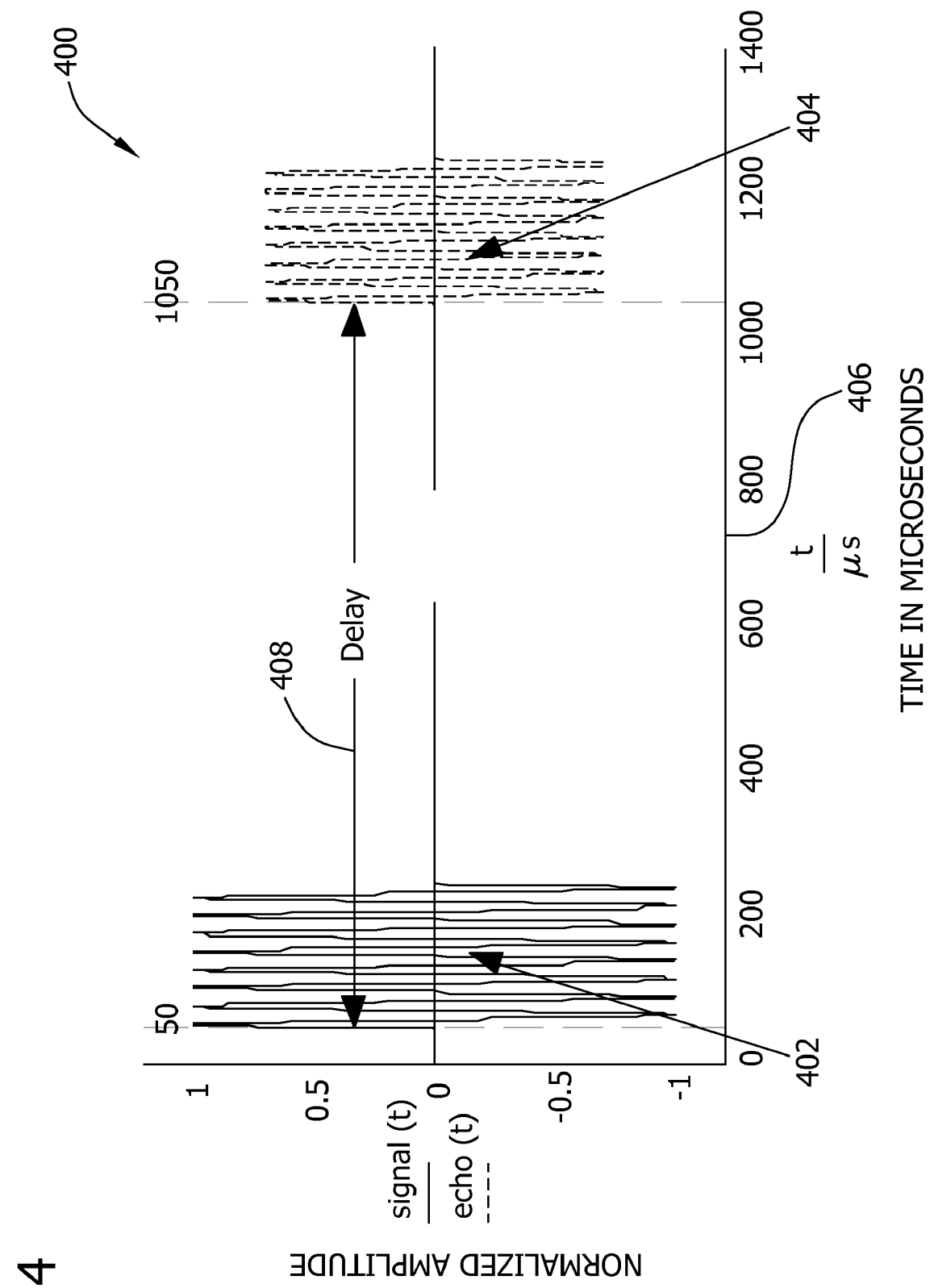
FIG. 4 is a graph illustrating a ranging signal transmission and echo as a function of time during operation of the system shown in FIG. 2.

FIG. 4 is a graph 400 illustrating a ranging signal transmission 402 and echo 404 as a function of time 406 during operation of system 218, shown in FIG. 2. As described herein, the ranging device emits a signal towards the membrane, and receives the reflected signal from the membrane. A ranging delay 408 is measured from the initial ultrasonic ranging transmission 402 to the time the echo 404 is received.

The ranging delay 408 is then used to determine a quantity of propellant in propellant tank. Specifically, and in one embodiment, the displacement of the membrane ($z_m$) from the center of the propellant tank is determined based on the measured ranging delay, wherein X and Y symmetry of the membrane is assumed.

$$z_m(T_t, P_t) = R_t - \frac{v(T_t, P_t) \cdot \text{Delay}(T_t, P_t)}{2} \quad (1)$$

wherein $R_t$ is the radius of the propellant tank (see FIGS. 2 and 3), $T_t$ is the temperature of the propellant tank measured using a temperature sensor (not shown) positioned permanently within the propellant tank, $P_t$ is the pressurant pressure that is determined from the pressurant mass, pressurant initial pressure, temperature and density. Furthermore, v is the propagation velocity of the ranging signal in the pressurant, which is a function of pressurant temperature and pressure.

In one embodiment, a mass of the propellant ($M_p$) within the propellant tank is then calculated using the displacement of the membrane ($z_m$) determined using equation (1). Specifically:

$$V_p(z_m) = \frac{2}{3}\pi \cdot R_t^3 + \frac{\pi}{6} \cdot z_m \cdot (3R_t^2 + z_m^2) \text{ for } z_m > 0 \qquad (2)$$

$$V_p(z_m) = \frac{2}{3}\pi \cdot R_t^3 - \frac{\pi}{6} \cdot z_m \cdot (3R_t^2 + z_m^2) \text{ for } z_m < 0 \qquad (3)$$

$$\rho_p(T_t) = 1025.6512 \, \frac{\text{kg}}{\text{m}^3} - \qquad (4)$$
$$0.87417369 T_t \, \frac{\text{kg}}{\text{m}^3 \cdot 1^\circ \text{C.}} - 4.528443310^{-4} \cdot T_t^2 \, \frac{\text{kg}}{\text{m}^3 \cdot (1^\circ \text{C.})^2}$$

$$M_p(z_m, T_t) = \rho_p(T_t) \cdot V_p(z_m) \qquad (5)$$

In one embodiment, a volume of the pressurant gas ($V_g$) is determined by subtracting the propellant volume (Vp), found using equations (2) or (3) detailed above, from the volume of the propellant tank, which is a constant. Further, since the pressurant mass is constant and a standard atomic weight of the pressurant is known, a density of the pressurant may be determined using the following:

$$V_g(z_m) = \frac{2}{3}\pi \cdot R_t^3 - \frac{\pi}{6} \cdot z_m \cdot (3R_t^2 + z_m^2) \text{ for } z_m > 0 \qquad (5)$$

$$V_g(z_m) = \frac{2}{3}\pi \cdot R_t^3 + \frac{\pi}{6} \cdot |z_m| \cdot (3R_t^2 + |z_m|^2) \text{ for } z_m < 0 \qquad (6)$$

$$\rho_g(z_m, T_t) = \frac{n(T_t) \cdot M_g}{V_g(z_m)} \qquad (7)$$

wherein the density of the pressurant ($\rho_g$) is a function of mass, volume and tank temperature. Further, n is defined as the number of moles of pressurant, and $M_g$ is defined as the atomic weight of the pressurant.

In one embodiment, following calculations (1) through (7), a center of gravity (CG) of the propellant tank is determined. More specifically, the center of gravity (CG) of the propellant tank is determined using the mass and centers of gravity of the propellant and pressurant within the propellant tank. Specifically, the centroid and volume of a hemisphere are determined respectfully using the following:

$$z_h = \frac{3}{8} R_t \qquad (8)$$

$$V_h = \frac{2}{3}\pi \cdot R_t^3 \qquad (9)$$

The centroid of volume below the membrane and above the lower hemisphere is determined by the following:

$$z_c(z_m) = \frac{1}{2} z_m \cdot \frac{z_m^2 + 2 \cdot R_t^2}{z_m^2 + 3 \cdot R_t^2} \qquad (10)$$

and the centroid of volume above the membrane and below the upper hemisphere is determined by the following:

$$z_s(z_m) = \frac{1}{2} \cdot \frac{z_m^3 + R_t^2 \cdot z_m + 3 \cdot z_m \cdot R_t^2 + 3 \cdot R_t^3}{z_m^2 + z_m R_t + 4 \cdot R_t^2} \qquad (10)$$

In one embodiment, the center of gravity (CG) of the propellant tank is then determined using the respective masses of the propellant and pressurant and the corresponding centers of gravity. Specifically, the center of gravity of the propellant tank is determined using one of the following:

$$z_{CG1}(z_m, T_t) = \frac{-z_h \cdot \rho_p(T_t) \cdot V_h + z_c(z_m) \cdot \rho_p(T_t) \cdot V_c(z_m) + z_s(z_m) \cdot \rho_g(z_m, T_t) \cdot V_g(z_m)}{\rho_p(T_t) \cdot V_h + \rho_p(T_t) \cdot V_c(z_m) + \rho_g(z_m, T_t) \cdot V_g(z_m)} \qquad (11)$$

$$z_{CG2}(z_m, T_t) = z_h \left( \frac{\rho_g(z_m, T_t) - \rho_p(T_t)}{\rho_g(z_m, T_t) + \rho_p(T_t)} \right) \qquad (12)$$

$$z_{CG3}(z_m, T_t) = \frac{-z_s(z_m) \cdot \rho_p(T_t) \cdot V_g(z_m) - z_c(z_m) \cdot \rho_g(z_m, T_t) \cdot V_c(z_m) + z_h \cdot \rho_g(z_m, T_t) \cdot V_h}{\rho_p(T_t) \cdot V_g(z_m) + \rho_g(z_m, T_t) \cdot V_c(z_m) + \rho_g(z_m, T_t) \cdot V_h} \qquad (13)$$

wherein $z_{CG1}$ is used when $Z_m > 0$, $Z_{CG2}$ is used when $z_m = 0$, and $z_{CG3}$ is used when $z_m < 0$.

Figure 5:
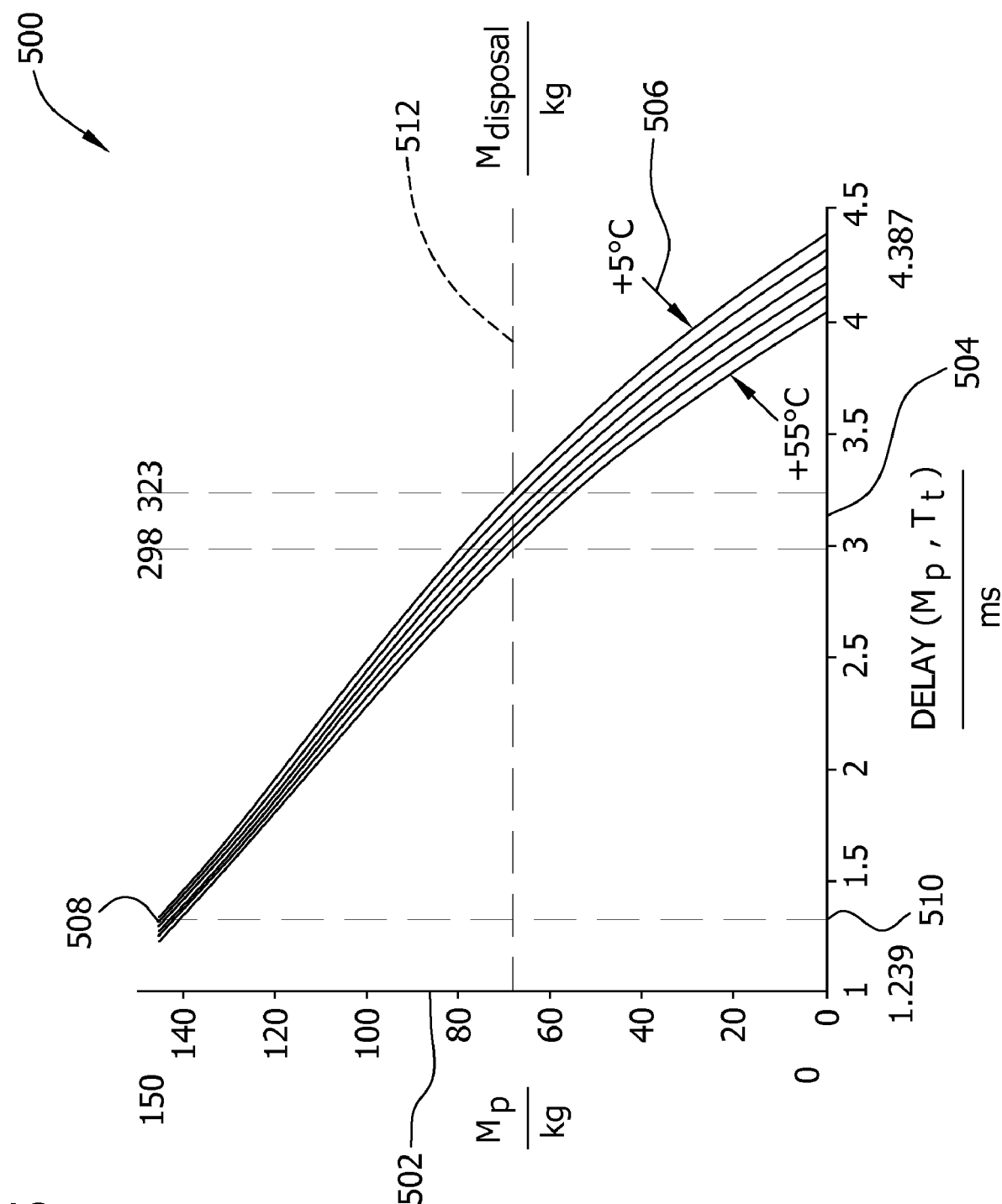
FIG. 5 is a graph illustrating a propellant mass versus a ranging delay for a plurality of temperatures.

FIG. 5 is a graph 500 illustrating the propellant mass ($M_P$) 502 versus the ranging delay 504 for a plurality of temperatures 506. In the exemplary illustration, the initially loaded mass of propellant is shown at 508. At initial mass 508, the ranging delay 510 is determined as described herein. As propellant is consumed over the lifetime of the satellite, the propellant quantity within tank decreases and the membrane displacement changes as a result thereof. The ranging delay increases as the membrane's distance from the ranging device increases.

In one embodiment, a predetermined quantity of fuel ($M_{disposal}$) 512 is required to perform end-of-life maneuvering of the satellite, i.e., to perform a burn that will maneuver the satellite into a proper disposal orbit outside the operational orbit. By using system 218 to accurately determine the mass of the propellant remaining in propellant tank, proper steps may be taken to plan end-of-life operations as the $M_{disposal}$ 512 threshold is approached.

Figure 6:
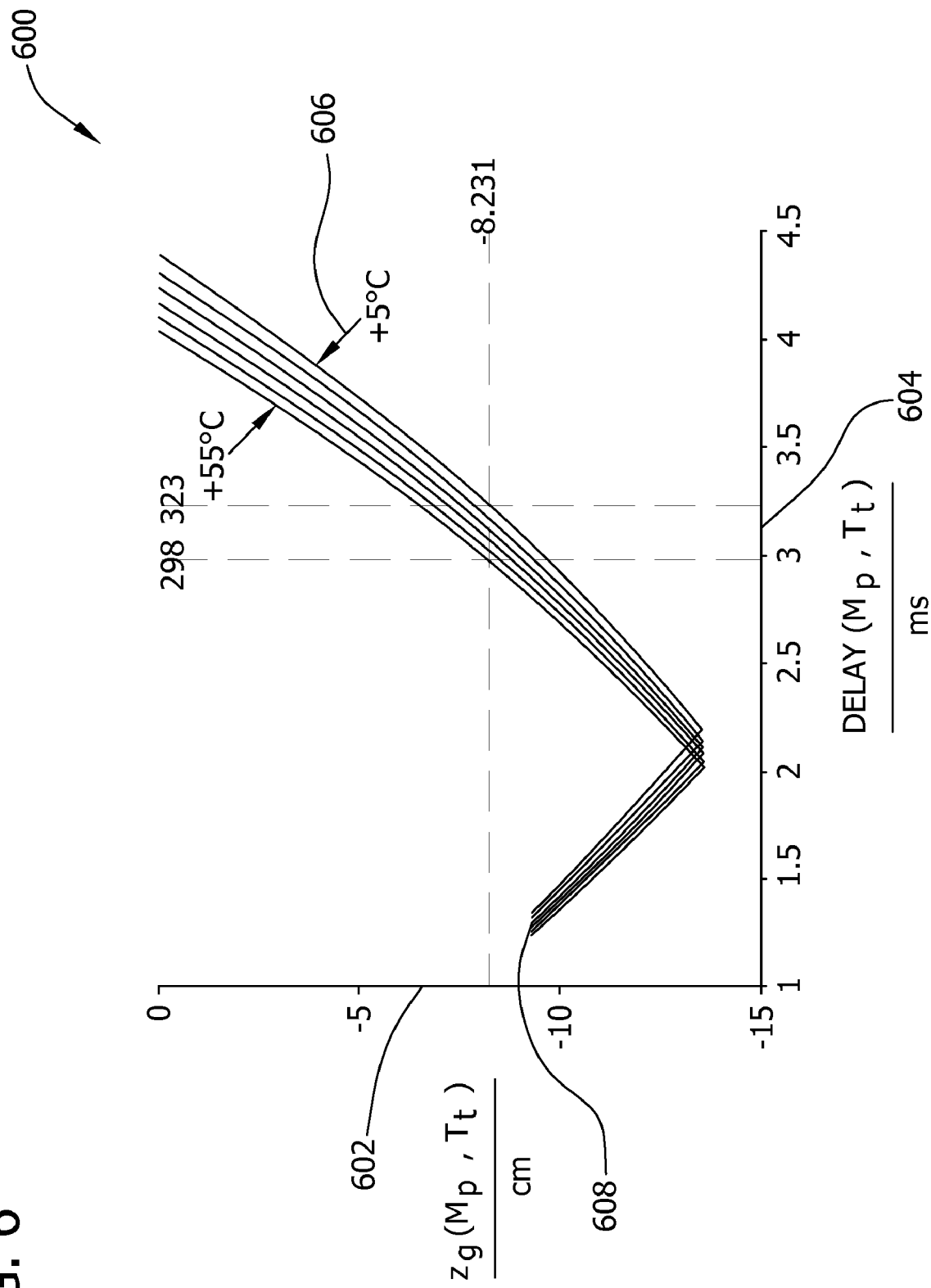
FIG. 6 is a graph illustrating a center of gravity of the propellant tank versus the ranging delay for a plurality of temperatures.

FIG. 6 is a graph 600 illustrating the center of gravity 602 of the propellant tank versus the ranging delay 604 for a plurality of temperatures 606. An initial position of the membrane is determined when the propellant tank is in the fully loaded configuration, as shown in FIG. 2. The membrane shifts as propellant is expended during the life of the satellite, and the corresponding ranging delay is used to calculate the center of gravity (CG) of the propellant tank as described herein.

Exemplary embodiments of systems for use in determining a propellant mass and center of gravity for three-axis stabilized satellites are described in detail above. The above-described systems and methods determine a delay between the burst of a ranging device, such as a laser or ultrasonic device, and its corresponding echo that is reflected from a membrane within the propellant tank. This information along with an available measured tank temperature and propellant content may be used to calculate the center of gravity of the tank throughout the mission lifetime. Accurate knowledge of propellant content in a propellant tank is important for all satellite missions (navigation, commercial, scientific or military). With this information, all mission lifetimes may be maximized, thus maximizing return on investment for a satellite customer. Accurate knowledge of the center of gravity of the propellant tanks in a three-axis stabilized satellite leads to accurate knowledge of the center of gravity for the entire satellite. With this information the phase center displacement of the system antenna with respect to the satellite's center of gravity is known. Reporting accurate location of the phase center of the navigation antenna to the user minimizes the User Range Error (URE), thus increasing the precision of position fix of the satellite user and/or customer.

Moreover, the systems and methods described herein require no additional tank, valves, activators or pressure gages. The weight and complexity of the ranging device is much less than an additional pressurant tank and associated interconnections with valves, actuators and pressure gauges. The systems and methods described herein require no moving parts and thus increase reliability and decreasing expense of the satellite. Furthermore, the systems and methods described herein account for propellant mass reduction due to potential tank leakages, again increasing the reliability of the propellant mass and center of gravity calculations.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

This written description uses examples to support the claims, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A three-axis stabilized spacecraft comprising:
   a propellant tank comprising an interior surface, a propellant section having a quantity of propellant therein, and a pressurant section having a quantity of a pressurant therein, the propellant section and the pressurant section being maintained separate from one another by a membrane; and
   a ranging device coupled to said interior surface, said ranging device configured to receive a ranging echo signal to facilitate determining a location of the membrane within said propellant tank.

2. A spacecraft in accordance with claim 1 further comprising a microprocessor communicatively coupled to said ranging device and programmed to:
   calculate a ranging delay based on the ranging echo;
   determine a displacement of the membrane from a center of the fuel tank based on the ranging delay; and
   determine a volume of propellant in said propellant tank using the determined displacement of the membrane.

3. A spacecraft in accordance with claim 2 wherein said microprocessor is further programmed to:
   calculate a mass of the propellant in the propellant tank based on the determined volume of the propellant; and
   determine a center of gravity of the propellant tank based on the calculated mass of the propellant.

4. A spacecraft in accordance with claim 3 wherein said microprocessor is further programmed to:
   determine a volume of the pressurant in the propellant tank using the determined displacement of the membrane; and
   calculate a mass of the pressurant in the propellant tank based on the determined volume of the pressurant.

5. A spacecraft in accordance with claim 1 wherein said ranging device is positioned along the interior surface within the pressurant chamber substantially perpendicular to an apex of the membrane.

6. A spacecraft in accordance with claim 1 wherein said ranging device transmits a ranging signal towards the membrane.

7. A spacecraft in accordance with claim 6 wherein said ranging device transmits one of a laser, an acoustic signal or an ultrasonic signal.

8. A system for determining a propellant content and a center of gravity in a three-axis stabilized spacecraft, said system comprising:
   a propellant tank comprising an interior surface, a propellant section having a quantity of propellant therein, and a pressurant section having a quantity of a pressurant therein, the propellant section and the pressurant section being maintained separate from one another by a membrane; and
   a ranging device coupled to an interior of the propellant tank of the spacecraft, said ranging device configured to receive a ranging echo signal to facilitate determining a location of the membrane within the propellant tank.

9. A system in accordance with claim 8 further comprising a microprocessor communicatively coupled to said ranging device and programmed to:
   calculate a ranging delay based on the ranging echo;
   determine a displacement of the membrane from a center of the fuel tank based on the ranging delay; and
   determine a volume of the propellant in the propellant tank using the determined displacement of the membrane.

10. A system in accordance with claim 9 wherein said microprocessor is further programmed to:
    calculate a mass of the propellant in the propellant tank based on the determined volume of the propellant; and
    determine a center of gravity of the propellant tank based on the calculated mass of the propellant.

11. A system in accordance with claim 10 wherein said microprocessor is further programmed to:
    determine a volume of the pressurant in the propellant tank using the determined displacement of the membrane; and
    calculate a mass of the pressurant in the propellant tank based on the determined volume of the pressurant.

12. A system in accordance with claim 8, wherein said ranging device is positioned along the interior surface within the pressurant chamber substantially perpendicular to an apex of the membrane.

13. A system in accordance with claim 8 wherein said ranging device transmits a ranging signal towards the membrane.

14. A system in accordance with claim 13 wherein said ranging device transmits one of a laser, an acoustic signal or an ultrasonic signal.

15. A method for determining a propellant content and a center of gravity in a three-axis stabilized spacecraft, said method comprising:

transmitting a ranging signal towards a membrane positioned within a propellant tank of the spacecraft, the propellant tank including a propellant section having a quantity of propellant therein, and a pressurant section having a quantity of a pressurant therein, the propellant section and the pressurant section being maintained separate from one another by the membrane;

determining, by a processor, a displacement of the membrane from a center of the fuel tank based on the transmitted ranging signal;

determining a volume of the propellant in the propellant tank using the determined displacement of the membrane;

calculating a mass of the propellant in the propellant tank based on the determined volume of the propellant; and determining a center of gravity of the propellant tank based on the calculated mass of the propellant.

16. A method in accordance with claim 15 wherein determining a volume of propellant in the propellant tank further comprises:

receiving a reflected ranging signal from the membrane;
   calculating a ranging delay based on the ranging echo;
   transmitting the ranging delay to a microprocessor.

17. A method in accordance with claim 15 wherein transmitting a ranging signal towards a membrane further comprises transmitting at least one of a laser, an acoustic signal or an ultrasonic signal towards the membrane.

18. A method in accordance with claim 15 further comprising:

determining a volume of propellant in the propellant tank using the determined displacement of the membrane.

calculating a mass of the propellant in the propellant tank based on the determined volume of the propellant; and determining a center of gravity of the propellant tank based on the calculated mass of the propellant.

19. A method in accordance with claim 18 further comprising:

determining a volume of the pressurant in the propellant tank using the determined displacement of the membrane; and calculating a mass of the pressurant in the propellant tank based on the determined volume of the pressurant.

* * * * *